United States Patent [19]

Moritaka, deceased et al.

[11] Patent Number: 4,687,669

[45] Date of Patent: Aug. 18, 1987

[54] PROCESS FOR PRODUCTION OF ENRICHED RICE OR BARLEY

[75] Inventors: Shintaro Moritaka, deceased, late of Kobe, Japan, by Junko Moritaka, Kazuya Moritaka, Takuya Moritaka, heirs; Yasuhiko Watanabe; Motoyuki Nishimura, both of Kobe, all of Japan

[73] Assignee: Takeda Chemical Industries, Ltd., Osaka, Japan

[21] Appl. No.: 568,923

[22] Filed: Jan. 6, 1984

[30] Foreign Application Priority Data

Jan. 14, 1983 [JP] Japan ................................ 58-4423

[51] Int. Cl.$^4$ ................ A23B 9/00; A23L 1/302; A23L 1/303; A23L 1/304

[52] U.S. Cl. ...................... 426/72; 426/73; 426/74; 426/93; 426/99; 426/309; 426/627

[58] Field of Search ............... 426/72, 73, 74, 93, 426/99, 309, 627, 96, 618

[56] References Cited

U.S. PATENT DOCUMENTS

| | | | |
|---|---|---|---|
| 1,964,867 | 7/1934 | Allyn | 426/96 |
| 2,475,133 | 7/1949 | Furter et al. | 426/309 |
| 2,775,521 | 12/1956 | Mateles et al. | 426/72 |
| 3,925,568 | 12/1975 | Rao et al. | 426/618 |
| 3,992,555 | 11/1976 | Kovacs | 426/72 |
| 4,070,488 | 1/1978 | Davis | 426/72 |

FOREIGN PATENT DOCUMENTS

| | | | |
|---|---|---|---|
| 9128 | 12/1955 | Japan . | |
| 131349 | 10/1981 | Japan . | |
| 0531225 | 12/1940 | United Kingdom | 426/72 |
| 0681930 | 10/1952 | United Kingdom | 426/72 |
| 1134793 | 11/1968 | United Kingdom | 426/309 |
| 0411829 | 6/1974 | U.S.S.R. | 426/618 |

*Primary Examiner*—Thomas G. Wiseman
*Assistant Examiner*—Elizabeth C. Weimar
*Attorney, Agent, or Firm*—Wenderoth, Lind & Ponack

[57] ABSTRACT

Polished rice or barley enriched with nutrients, said nutrients being fixed in and on the grain by coating an oil/fat and a wax which do not melt at ordinary temperature but melt on heating. Said enriched polished rice or barley has essential nutrients in good balance and the nutrients can be retained on the grains when washing them before cooking.

11 Claims, No Drawings

PROCESS FOR PRODUCTION OF ENRICHED RICE OR BARLEY

The present invention relates to enriched rice or barley containing nutrients in good balance and their production.

Cereal grains such as rice and barley are subjected to cleaning for marketing in polished form and they are generally washed with water before cooking. Most of the essential nutrients such as vitamins and minerals are lost in the polishing or washing process.

To overcome this disadvantage, vitamin $B_1$-enriched rice or barley, which is blended with the polished rice, has been marketed and has contributed to the improvement of nutritional state. However, in the case that a balance of nutrition is considered, it is obviously of great importance to provide rice or barley enriched not only with vitamin $B_1$ but also with other nutrients in good balance.

As typical methods for producing enriched rice or barley, the so-called acid parboiled rice method and the coating method are known. The former method comprises immersing polished rice or barley in an acidic aqueous solution of nutrients for a certain time period, then steaming the rice or barley in an atmosphere of superheated steam for a very brief time, and finally drying the grains in a hot current of air. In this method, however, rice or barley cannot be enriched with water-insoluble, fat-soluble vitamins such as vitamin A, vitamin D and vitamin E. Calcium, iron and minerals cannot be used for this purpose either for the majority of the corresponding donor or precursor materials are insoluble or only sparingly soluble in water.

As for the coating method, there are many reports on the subject and the basic principle of the proposed processes comprises coating polished rice or barley with enriching nutrients and, for the purpose of preventing loss of these nutrients in washing the cereals to ready them for cooking, recoating the cereals with a solution of some water-insoluble film-forming material, for example zein, which is a constituent protein of Indian corn, or a natural resinous shellac secreted from the body surface of certain species of insects, in such a solvent as ethanol, isopropyl alcohol or the like. The method enables one to produce an enriched polished rice or barley containing fat-soluble vitamins and minerals but the use of a solvent not only leads to an increased scale of the necessary production equipment but also entails a significantly increased cost of enriched polished rice or barley.

In view of the above situation, the present inventors conducted intensive research to develop a profitable commercial process for producing enriched polished rice or barley and found that a high-quality enriched polished rice or barley featuring a minimum of washing loss of added nutrients can be provided at low cost by incorporating or depositing nutrients in or on polished rice or barley grains and, then, coating the grains with a spray-mist of an emulsion containing both an oil/fat and a wax. This invention is based on the above finding.

Thus, an object of this invention is to provide a polished enriched rice or barley having improved quality.

Another object of this invention is to provide a process for producing enrich polished rice or barley, which comprises incorporating or depositing nutrients in or on polished grains of rice or barley coating the grains with an emulsion containing an oil/fat and a wax which melt at about 40° to 80° C.

The term "oil/fat" means "oil or/and fat" which is a group of materials mainly composed of glyceride esters of fatty acids.

The polished rice or barley which can be used for the aforesaid enriching treatment according to this invention is virtually unlimited. For example, the variety, the degree of polishing and so on of such material cereals are optional. As to polished barley, it may be a pressed barley obtainable by the conventional pressing process.

The nutrients used for enriching polished rice or barley according to this invention include, for example, water-soluble vitamins (vitamin $B_1$, vitamin $B_2$, vitamin C, vitamin $B_6$, nicotinic acid, pantothenic acid, etc.), fat-soluble vitamins (vitamin A, vitamin D, vitamin E, etc.), amino acids (lysine, threonine, etc.) and minerals (calcium, iron, etc.). Each of these nutrients can be selected from among the various compounds which have been approved for addition to foodstuffs, extracts from natural products, purified preparations thereof, and so on. The oil/fat and wax used in accordance with this invention may be virtually any kind only if they melt at about 40° to 80° and which do not adversely affect the palatability, flavor and taste of cooked rice or barley. For example, said oil/fat includes such hydrogenated vegetable oils as hydrogenated soybean oil, cottonseed oil, rapeseed oil, rice oil, corn oil, etc., animal fats such as beef/tallow, lard, etc, and hydrogenated animal fats obtainable therefrom, and sperm oil. The wax used in the present invention includes an animal or plant wax such as carnauba wax, candelilla wax, rice bran wax, bees wax, etc.

In the production process according to this invention, such oil/fat and such wax are used in combination to prepare an emulsion which is then used as a coating material for rice or barley. The oil/fat-to-wax ratio is selected in consideration of the combination referred to above. Generally, the wax is used in a proportion of about 1 to 100 weight parts, preferably about 5 to 80 weight parts, based on 100 weight parts of oil/fat. To prepare the emulsion, about 100 to 1000 weight parts of water and about 1 to 100 weight parts of an emulsifying agent are added to each 100 weight parts of oil/fat in the oil/fat and wax combination mentioned above and the mixture is emulsified in the conventional manner. The emulsifying agent may be any material that is capable of emulsifying both components. Thus, for example, emulsifiers such as sucrose fatty acid esters, sorbitan fatty acid esters, glycerol fatty acid esters, etc. and natural mucilages, etc. such as gum arabic, gum xanthane, gelatin, agar, etc. can be mentioned. The emulsification is accomplished in a stirring or pressure emulsifying machine at a temperature over the melting points of the oil/fat and wax.

If necessary, for the purpose of coloring the finished enriched rice or barley, vitamin $B_2$ or a suitable pigment (e.g. chlorophyll, $\beta$-carotin, gardenia yellow, etc.) may be added to the above emulsion.

The present method comprising incorporation or deposition of nutrients and subsequent coating with such emulsion will now be described with reference to the case in which polished rice is used as an exemplary raw material.

The procedure for incorporating or depositing nutrients in or on polished rice grains may be a conventional one. When the nutrients are water-soluble, polished rice grains are first immersed in an acid solution of the nutrients for a predetermined time, then steamed in a superheated water vapor for a very brief time and finally dried in a hot currnet of air. Alternatively, polished rice grains may be coated with such nutrients. Generally, however, better quality can be obtained by the former method, for the rice grains are gelatinized. In the case of water-insoluble or very sparingly water-soluble nutrients such as fat-soluble vitamins, minerals, etc., either polished rice grains as such or said rice grains having water-soluble nutrients deposited and dried are treated by depositing the water-insoluble or very sparingly water-soluble nutrients thereon, by coating, for instance.

The coating process referred to above may be conducted in the conventional manner. By way of illustration, polished rice is put in a coating pan and in a hot draft of air an aqueous solution containing the enriching nutrients and a binder such as gelatin, gum arabic, $\alpha$-starch, sucrose or/and the like is sprayed over the rice grains.

The kinds and proportions of enriching nutrients can be selected as desired. For example, it is also good practice to add those nutrients which are lost in hulling and polishing so as to make up for the loss and recover the levels in unpolished or brown rice. The amount of nutrients is generally decided depending upon the ratio of the enriched grains to the ordinary grains (polished grains) to be blended. For example, in case that the enriched grains are blended with the ordinary grains in a ratio of 1:100 to 200, the nutrients are incorporated or deposited in or on polished grains in an amount as follows:

vitamin $B_1$: about 0.07 g to 0.3 g
vitamin $B_2$: about 0.003 g to 0.012 g
nicotinic acid: about 0.3 g to 1.2 g
pantothenic acid: about 0.1 g to 0.5 g
vitamin $B_6$: about 0.004 g to 0.02 g
vitamin E: about 0.07 g to 0.3 g
vitamin A: about 50000(I.U.) to 200000(I.U.)
vitamin D: about 20(I.U.) to 100(I.U.)
vitamin C: about 1 g to 5 g
calcium about 0.4 g to 1.6 g
iron: about 0.06 g to 0.25 g
lysine about 3 g to 15 g
(the amount is based on 100 g of finished enriched grains).

Considering the standard quantity required for fortification of the cereal grains, than a larger amount above makes it difficult to blend the enriched grains with the ordinary grains uniformly. On the other hand, a smaller amount is also not good, for it causes too much increase in the ratio of the enriched grains to the ordinary grains.

After incorporation or deposition of nutrients in or on polished rice grains, the grains are coated with the aforesaid emulsion in order to fix the nutrients. The coating may be accomplished by any method only if the grain surface may thereby be evenly covered with the emulsions, but it is generally preferable to use a spray-coating procedure. For example, this can be accomplished by spraying rice grains in a coating pan with said emulsion at about 20 to 70° C. under stirring and in a constant supply of warm air at about 40 to 100° C.

This spraying with the emulsion is conducted until rice grains are coated with the oil/fat and wax to the extent that the loss of nutrients on washing of enriched rice can be prevented. For this purpose, it is generally preferable to conduct the coating process so that the finished enriched rice carries at least about 2 weight %, preferably about 3 weight %, of oil/fat and wax combined. If rice grains are coated too thickly with the oil/fat and wax, the flavor of cooked rice tends to be adversely affected. To prevent this, it is generally desirable to ensure that the finished enriched rice does not contain more than about 7 weight % of oil/fat and wax combined.

The enriched polished rice of this invention can thus be produced, and the same applies to enriched polished barley.

The enriched polished rice or barley obtainable by the method of this invention has a distinct advantage due to the fact that it is coated, for example by way of spraying, with said emulsion containing the oil/fat and wax which do not melt at ordinary temperature but melt on heating. Thus, if polished rice or barley grains are coated with oil/fat alone, its film is easily peeled off from the polished grains by a relatively moderate impact force or the like and the nutrients cannot be retained on the grains in washing them before cooking. In contrast, the production method according to this invention overcomes these disadvantages in a considerable measure and allows one to easily enrich rice or barley with essential nutrients in good balance.

Moreover, unlike the prior art method using zein, shellac, etc., the present method does not involve use of an organic solvent in the coating stage so that the production equipment is less complicated or bulky and the cost of production is reduced. Furthermore, in the method according to this invention, enriched rice or barley can be colored easily and stably to impart an improved appearance to finished cereals.

The following experimental and working examples are further illustrative of this invention.

EXPERIMENTAL EXAMPLE 1

In a rotary coating pan, 2.0 kg of polished rice was immersed in 400 ml of a 1% aqueous acetic acid solution containing 3.0 g of vitamin $B_1$ hydrochloride at the solution temperature of about 35° C. for 2 hours, whereby the vitamin solution was thoroughly absorbed into the rice grains. The rice was then steamed in a water vapor at about 100° C. for about 2 minutes and, then, dried in a hot air current of about 70° C. for 1 hour. After completion of the drying, the grains were sieved to remove the bound and crushed rice grains, giving 1.95 kg of dried rice with a water content of 13.0%. This 1.95 kg of dried rice was put in the coating pan and spray-coated with 250 g of an aqueous suspension containing 11 g of natural vitamin E, 40 g of calcium carbonate and 10 g of gelatin. The rice was further spray-coated with 300 g of an emulsion containing 80 g of a varying mixture of hydrogenated cottonseed oil (m.p. about 70° C.) and rice bran wax (m.p. about 75° C.), 8 g of sucrose fatty acid ester and 212 g of water to give about 2.0 kg of enriched polished rice containing vitamin $B_1$, vitamin E and calcium. Two hundred grains of this enriched rice were put in a friability tester which was then rotated at 30 r.p.m. for a total of 200 turns and then the appearance of enriched rice was examined with the naked eye.

Results:

The results are shown in Table 1.

TABLE 1

| No. | Hydrogenated cottonseed oil (wt. parts) | Rice bran wax (wt. parts) | Formation of bound rice grains during production* | Peeling of film at friability test** |
|---|---|---|---|---|
| 1 | 100 | 0 | — | + |
| 2 | 100 | 5 | — | — |
| 3 | 100 | 10 | — | — |
| 4 | 100 | 50 | — | — |
| 5 | 100 | 80 | — | — |
| 6 | 100 | 100 | ± | — |

Notes
*—: No bound grains
±: A few bound grains
±: Considerable bound grains
**—: No peeling of film
±: Slight peeling of film
+: Considerable peeling of film Table 1 clearly indicates the advantages of this invention. Thus, enriched polished rice coated with an emulsion of hydrogenated cottonseed oil alone (No. 1) underwent rapid peeling of the hydrogenated oil film. Thus, even if rice grains are coated with hydrogenated oil for the purpose of preventing loss of nutrients in washing, the oil film is readily peeled off during repackaging or transport so that the treatment cannot attain the expected result. When rice bran wax was used in combination with hydrogenated oil, the strength of the oil film was increased so that no peeling occurred with enriched polished rice samples treated with 5% or more of rice bran wax (No. 2 to No. 6). Incidentally, when an emulsion of rice bran wax alone was used, the rice grains bound to each other so that the desired product could not be obtained.

EXPERIMENTAL EXAMPLE 2

In a rotary coating pan, 2.0 kg of polished rice was immersed in 400 ml of a 1% aqueous acetic acid solution containing 3.0 g of vitamin B hydrochloride at the solution temperature of about 35° C. for 2 hours, whereby the vitamin solution was thoroughly absorbed into the rice grains. The rice was then steamed in a water vapor at about 100° C. for about 2 minutes and finally dried in a hot air current of about 70° C. for 1 hour. After completion of the drying, the rice was sieved to remove bound and crushed grains to thereby give 1.96 kg of dried rice with a water content of 12.9%.

This 1.96 kg of dried rice was put in the coating pan, and sprayed with 250 g of an aqueous solution containing 11 g of natural vitamin E oil, 40 g of calcium carbonate and 10 g of gelatin. The rice was further sprayed with 400 g of an emulsion containing 68 g of hydrogenated cottonseed oil, 12 g of rice bran wax, 8 g of sucrose fatty acid ester, 312 g of water and 0.1 g of vitamin $B_2$ to give about 2.0 kg of yellow-colored polished rice enriched with vitamin $B_1$, vitamin E and calcium. Separately, enriched rice samples spray-coated with 100 g, 200 g and 300 g of said emulsion and a sample uncoated with the emulsion were also prepared in otherwise the same manner.

300 g of polished rice was blended with 1.5 g of each of the above enriched polished rice samples and the blended rice was washed with water for cooking under predetermined conditions to determine the amounts of vitamin $B_1$, vitamin E and calcium in the washings.

Results:

The percentage of the amount of vitamin $B_1$, vitamin E or calcium in the washings against the corresponding content of enriched polished rice is shown as the washing loss rate in Table 2.

TABLE 2

| No. | Total amount of hydrogenated cottonseed oil and rice bran wax (%)* | Washing loss rate (%) | | |
|---|---|---|---|---|
| | | Vitamin $B_1$ | Vitamin E | Calcium |
| 1 | 0 | 65 | 75 | 76 |
| 2 | 1.1 | 47 | 59 | 57 |
| 3 | 1.9 | 25 | 33 | 34 |
| 4 | 3.1 | 6 | 10 | 9 |
| 5 | 4.2 | 3 | 7 | 6 |

Note:
*Content in enriched polished rice

Table 2 clearly indicates the advantages of this invention. When the enriched polished rice sample free from hydrogenated cottonseed oil and rice bran wax (No. 1) and the enriched polished rice sample coated with about 1% of a mixture of hydrogenated cottonseed oil and rice bran wax (No. 2) were washed with water for cooking, 47 to 76% of vitamin $B_1$, vitamin E and calcium were lost into the washings. In contrast, the sample coated with about 2% of the hydrogenated cottonseed oil-rice bran wax mixture (No. 3) showed only a loss of 25 to 34%, and the sample coated with about 3% or more of the hydrogenated cottonseed oil-rice bran wax mixture (No. 4 and No. 5) showed a very small loss of nutrients, i.e. less than 10%.

EXPERIMENTAL EXAMPLE 3

In a rotary coating pan, 2.0 kg of polished rice was immersed in 400 ml of a 1% aqueous acetic acid solution containing 3.0 g of vitamin $B_1$ hydrochloride at a bath temperature of about 35° C. for 2 hours, whereby the vitamin solution was thoroughly absorbed into the rice. The rice was then steamed in a water vapor at about 100° C. for about 2 minutes and finally dried at about 70° C. After completion of the drying, the rice was sieved to remove bound and crushed grains to thereby give 1.97 kg of dried rice with a water content of 13.1%.

In the coating pan, 1.97 kg of the above dried rice was spray-coated with 300 g of a suspension containing 40 g of calcium carbonate, 11 g of ferric pyrophosphate and 10 g of gelatin. The rice was further spray-coated with 250 g of an emulsion prepared by emulsifying 70 g of hydrogenated cottonseed oil and 10 g of rice bran wax in 162 g water with 8 g of sucrose fatty acid ester to give about 2.0 kg of enriched polished rice containing vitamin $B_1$, iron and calcium. Separately, a mixture of 70 g of hydrogenated cottonseed oil and 10 g of rice bran wax was melted and spray-coated when hot on enriched polished rice to provide a control sample.

To 300 g of polished rice was added 1.5 g of the above enriched rice and the mixture was washed with water to determine the amounts of vitamin $B_1$, iron and calcium in the washings.

Results:

The percentage of loss of each of vitamin $B_1$, iron and calcium against the corresponding initial content of enriched polished rice is shown as the washing loss rate in Table 3.

TABLE 3

| Method of coating with hydrogenated cottonseed oil and rice bran wax | Washing loss rate (%) | | |
|---|---|---|---|
| | Vitamin $B_1$ | Iron | Calcium |
| Control — Hot-melt spray | 10 | 12 | 11 |
| This invention — Emulsion spray | 4 | 5 | 5 |

Table 3 clearly indicates the advantages of this invention. Thus, whereas the enriched rice coated with a hot melt of hydrogenated cottonseed oil and rice bran wax showed 10% and greater loses of vitamin $B_1$, iron and calcium, the enriched rice spray-coated with the emulsion showed only 5% or less loses of nutrients in washing despite the same amounts of hydrogenated cottonseed oil and rice bran wax were used as in the control rice.

EXAMPLE 1

In a coating pan, 2 kg of rice was immersed in 400 ml of a 9% aqueous acetic acid solution containing 7.0 g of dibenzoylthiamine hydrochloride, 0.12 g of vitamin $B_2$, 13.5 g of nicotinamide, 6.1 g of calcium pantothenate and 0.2 g of pyridoxine hydrochloride at a bath temperature of about 35° C. for 2 hours. The immersed rice was taken out and steamed in a water vapor at about 100° C. for about 2 minutes and finally dried in a warm air current of about 70° C. for about 1 hour. Then, the rice was sieved to remove bound and crushed grains to thereby give 1.95 kg of dried rice with a water content of 12.8%. The rice was transferred to the coating pan, where it was spray-coated with 250 g of an aqueous suspension containing 10 g of natural vitamin E, 40 g of calcium carbonate and 10 g of gelatin. The rice was further spray-coated with 600 g of an emulsion containing 60 g of hydrogenated cottonseed oil, 48 g of rice bran wax, 12 g of sucrose fatty acid ester, 0.2 g of vitamin $B_2$ and 0.8 g of natural chlorophyll preparation (balance $H_2O$) to give 2.0 kg of enriched polished rice containing 7 different added nutrients.

The above rice was blended with polished rice in a ratio of 1 to 200 and the blended rice was washed with water to determine the washing loss rate. The rate was found to be about 5%.

EXAMPLE 2

In a coating pan, 2.0 kg of polished rice was spray-coated with 400 g of an aqueous suspension containing 3.0 g of vitamin $B_1$ hydrochloride, 2.0 g of vitamin A oil, 40 g of calcium carbonate and 20 g of gelatin. The rice was further spray-coated with 300 g of an emulsion containing 57 g of hydrogenated beef tallow, 3 g of candellila wax, 20 g of gum arabic, 0.2 g of vitamin $B_2$ and 0.1 g of 10% β-carotin preparation (balance $H_2O$) to give about 2.0 kg of enriched polished rice containing vitamin $B_1$, vitamin A and calcium.

This enriched rice was blended with polished rice in a ratio of 1 to 200 and the blended rice was washed with water to determine the washing loss rate. The rate was about 15%.

EXAMPLE 3

In a coating pan, 1.0 kg of polished barley was spray-coated with 70 g of an aqueous suspension containing 1.5 g of vitamin $B_1$ hydrochloride, 20 g of calcium carbonate, 5 g of ferric pyrophosphate, 2 g of gum arabic and 6 g of sucrose. The barley was further spray-coated with 300 g of an emulsion containing 57 g of hydrogenated rapeseed oil, 3 g of carnauba wax, 12 g of sucrose fatty acid ester and 0.2 g of vitamin $B_2$ (balance $H_2O$) to give about 1.0 kg of enriched polished barley containing vitamin $B_1$, calcium and iron.

The above enriched barley was blended with polished rice in a ratio of 1:200 and the mixture was washed with water to determine the loss of nutrients. The washing loss rates were about 5%.

EXAMPLE 4

In a coating pan, 2 kg of polished rice was immersed in 400 ml of a 9% aqueous solution of acetic acid containing 7.0 g of dibenzoylthiamine hydrochloride, 0.12 g of vitamin $B_2$, 13.5 g of nicotinamide, 6.6 g of calcium pantothenate and 0.2 g of pyridoxine hydrochloride at a bath temperature of 35° C. for 2 hours. The rice was then steamed at about 100° C. for about 2 minutes and finally dried in a warm air current of about 70° C. for about 1 hour. After drying, the rice was sieved to remove bound and crushed grains, giving about 1.96 kg of dried rice with a water content of 13.1%. The dried rice was transferred to the coating pan, where it was spray-coated with 300 g of an aqueous suspension containing 10 g of natural vitamin E, 40 g of calcium carbonate, 10 g of ferric pyrophosphate, 10 g of gelatin and 10 g of sucrose. Then, the rice was further spray-coated with 600 g of an emulsion containing 70 g of hydrogenated cottonseed oil, 3.5 g of bees wax, 12 g of sucrose fatty acid ester and 0.2 g of vitamin $B_2$ (balance $H_2O$) to give about 2.0 kg of enriched polished rice containing 8 different added nutrients.

The above enriched rice was blended with polished rice in a ratio of 1 to 200 and the blended rice was washed. The washing loss rates of the nutrients were about 10%.

What we claim is:

1. A process for producing enriched polished rice or rice or barley, which comprises incorporating or letting depositing nutrients in or on polished rice or barley grains, and subsequently coating the resultant grains with an aqueous emulsion containing an oil/fat and a wax wherein each of the components melts at about 40° to 80° C.

2. The process according to claim 1, wherein the emulsion contains the wax in a proportion of about 1 to 100 weight parts based on 100 weight parts of the oil/fat.

3. The according to claim 1, wherein the oil/fat is sperm oil, hydrogenated cottonseed oil, hydrogenated beef tallow or hydrogenated rapeseed oil, and the wax is rice bran wax, candellila wax, carnauba wax or bees wax.

4. The process according to claim 1, wherein the coating amount of the oil/fat and the wax is about 2 to 7 weight %, relative to the weight of the finished enriched rice or barley.

5. The process according to claim 1, wherein the coating of the emulsion is accomplished by a spray-coating procedure.

6. The process according to claim 1, wherein the nutrients are water-soluble vitamins, fat-soluble vitamins, amino acids or minerals.

7. Polished rice or barley enriched with nutrients, said nutrients being fixed in or on the grains by coating the polished rice or barley grains, in or on which the nutrients are incorporated or deposited, with an oil/fat and a wax wherein each of the components melts at about 40° to 80° C.

8. Polished rice or barley enriched with nutrients according to claim 16, wherein the amount of the wax is about 1 to 100 weight parts based on 100 weight parts of the oil/fat.

9. Polished rice, or barley enriched with nutrients according to claim 7, wherein the coating amount of the oil/fat and the wax is about 2 to 7 weight %, relative to the weight of the finished enriched rice or barley.

10. Polished rice or barley enriched with nutrients according to claim 7, wherein the nutrients are water-soluble vitamins, fat-soluble vitamins, amino acids or minerals.

11. Polished rice or barley enriched with nutrients according to claim 7, wherien the oil/fat is sperm oil, hydrogenated cottonseed oil, hydrogenated beef tallow or hydrogenated rapeseed oil, and the wax is rice bran wax, candellila wax, carnauba wax or bees wax.

* * * * *